Patented Mar. 3, 1953

2,630,460

UNITED STATES PATENT OFFICE 2,630,460

PRODUCTION OF A 4-ALKYLBIPHENYL

Vladimir N. Ipatieff and Herman Pines, Chicago, Ill., assignors to Universal Oil Products Company, Chicago, Ill., a corporation of Delaware No Drawing. Application January 31, 1950, Serial No. 141,609

14 Claims. (Cl. 260—668)

This invention relates to a process for producing a 4-alkylbiphenyl and particularly for producing 4-isopropylbiphenyl.

An object of this invention is the production of a 4-alkylbiphenyl.

Another object of this invention is the production of 4-isopropylbiphenyl.

A further object of this invention is a process for dehydrogenating 1-alkyl-1-phenyl-4-isopropylcyclohexane.

One specific embodiment of this invention relates to a process for producing a 4-alkylbiphenyl which comprises catalytically cycloalkylating benzene with a member of the group consisting of a monocyclic dihydroterpene, a homologue of a monocyclic dihydroterpene having the general formula (in which the double bond is represented by a broken line as its exact position is immaterial):

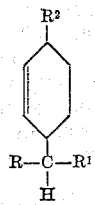

in which each of R and R¹ represents an alkyl group, and R² represents a member of the group consisting of a methyl group and an ethyl group, a dihydroterpenic alcohol represented by one of the formulae:

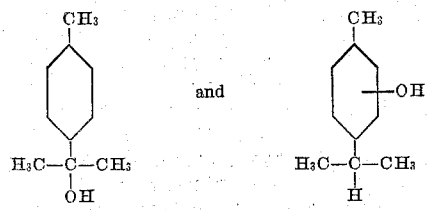

and a homologue of a dihydroterpenic alcohol represented by one of the formulae:

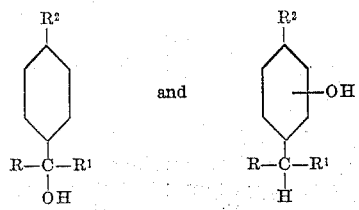

in which each of R and R¹ represents an alkyl group and R² represents a member of the group consisting of a methyl group and an ethyl group to form 1-alkyl-1-phenyl-4-alkylcyclohexane, dehydrogenating the last-named compound to form a 4-alkylbiphenyl, a gaseous paraffin hydrocarbon and hydrogen, and recovering said 4-alkylbiphenyl.

Another embodiment of this invention relates to a process for producing 4-isopropylbiphenyl which comprises catalytically alkylating benzene with a monocyclic dihydroterpene to form 1-methyl-1-phenyl-4-isopropylcyclohexane, dehydrogenating the last-named compound to form 4-isopropylbiphenyl, methane and hydrogen, and recovering said 4-isopropylbiphenyl.

Still another embodiment of this invention relates to a process for producing 4-isopropylbiphenyl which comprises catalytically alkylating benzene with a dihydroterpenic alcohol to form 1-methyl-1-phenyl-4-isopropylcyclohexane, dehydrogenating the last-named compound to form 4-isopropylbiphenyl, methane and hydrogen, and recovering said 4-isopropylbiphenyl.

A further embodiment of this invention relates to a process for producing 4-isopropylbiphenyl which comprises alkylating benzene with dihydrolimonene in the presence of hydrogen fluoride catalyst to form 1-methyl-1-phenyl-4-isopropylcyclohexane, dehydrogenating the last-named compound to form 4-isopropylbiphenyl, methane and hydrogen, and recovering said 4-isopropylbiphenyl.

A still further embodiment of this invention relates to a process for producing 4-isopropylbiphenyl which comprises alkylating benzene with para-menthene in the presence of hydrogen fluoride catalyst to form 1-methyl-1-phenyl-4-isopropylcyclohexane, dehydrogenating the last-named compound to form 4-isopropylbiphenyl, methane and hydrogen, and recovering said 4-isopropylbiphenyl.

An additional embodiment of this invention relates to a process for producing 4-isopropylbiphenyl which comprises alkylating benzene with menthol in the presence of hydrogen fluoride catalyst to form 1-methyl-1-phenyl-4-isopropylcyclohexane, dehydrogenating the last-named compound to form 4-isopropylbiphenyl, methane and hydrogen, and recovering said isopropylbiphenyl.

Another embodiment of this invention relates to a process for producing 4-isopropylbiphenyl which comprises alkylating benzene with dihydroterpineol in the presence of hydrogen fluoride catalyst to form 1-methyl-1-phenyl-4-isopropylcyclohexane, dehydrogenating the last-named compound to form 4-isopropylbiphenyl, methane and hydrogen, and recovering said 4-isopropylbiphenyl.

The monocyclic dihydroterpenes and dihydroterpenic alcohols which may be used as cycloalkylating agents in this process include dihydrolimonene which may also be referred to as 1-methyl-4-isopropylcyclohexene, a mixture of para-menthenes, a homologue of a cyclic dihydroterpene having the general formula (in which the double bond is shown by a broken line as its location is immaterial, that is, may be at any possible place in the molecule):

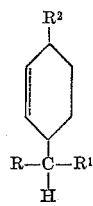

wherein each of R and $R^1$ represents an alkyl group and $R^2$ represents a member of the group consisting of a methyl group and an ethyl group, menthol (which may also be referred to as 2-isopropyl-5-methylcyclohexanol) and dihydroterpineol which may also be referred to as dimethyl-(4-methylcyclohexyl)-carbinol. Also a similar type of reaction is obtained by cycloalkylating benzene with a homologue of a dihydroterpene, especially a homologue in which the isopropyl group of the dihydroterpene is replaced by a secondary butyl group, a secondary amyl group, or another secondary alkyl group, or by a primary group represented by the formula

in which R represents an ethyl group, or a higher alkyl group. These primary and secondary alkyl groups may be represented by the formula

in which R represents an alkyl group of at least two carbon atoms and $R^1$ represents a member of the group consisting of hydrogen and an alkyl group.

Catalysts employed in the cycloalkylation step of the process include acid-acting alkylating catalysts such as sulfuric acid, phosphoric acid, hydrogen fluoride, and the like. Liquid hydrofluoric acid containing 90% or more of hydrogen fluoride is a preferred catalyst for the alkylation of benzene with a dihydroterpene or a dihydroterpenic alcohol. The dehydrogenation step of the process is effected in the presence of a suitable dehydrogenation catalyst such as a composite of activated alumina and an oxide of a metal selected from the members of the left-hand columns of groups IV, V and VI of the periodic table, and particularly from group VI thereof, preferably at a temperature of from about 400° to about 550° C. A dehydrogenation catalyst which has a high activity in this process consists of activated alumina composited with from about 4 to about 20% by weight of chromium sesquioxide, $Cr_2O_3$. A platinum catalyst as one containing from 1 to 10% by weight of platinum on alumina or silica is also effective in this dehydrogenation treatment at a temperature of from about 300° to about 425° C.

According to this process, a monocyclic dihydroterpene or a dihydroterpenic alcohol is reacted with benzene in the presence of an alkylating catalyst, such as hydrogen fluoride, to form 1-methyl-1-phenyl-4-isopropylcyclohexane as indicated by the following equation:

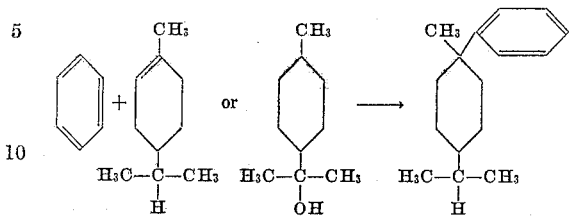

In the presence of hydrogen fluoride catalyst, the cycloalkylation step of the process is carried out at a temperature of from about −10° to about +50° C. at a pressure sufficient to maintain the catalyst in substantially liquid phase.

The alkylation product formed by the first step of the process as indicated in the foregoing equation, namely, 1-methyl-1-phenyl-4-isopropylcyclohexane is then subjected to dehydrogenation in the presence of a catalyst. For example, in the presence of a composite of chromium sesquioxide and alumina at a temperature of 450° C. and at substantially atmospheric pressure, this dehydrogenation may be represented by the following equation which shows 4-isopropylbiphenyl as a desired product.

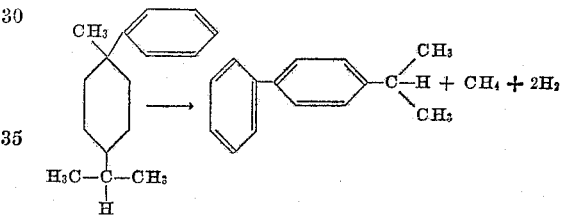

This dehydrogenation step, generally at a temperature of from about 300° to about 550° C. involves not only the removal of hydrogen from the cyclohexane ring but also the elimination of the geminal methyl group as methane. Because of the elimination of the geminal methyl group, the formation of 4-isopropylbiphenyl is unexpected.

Similarly, the alkylation products formed from benzene and homologues of dihydroterpenes containing not an isopropyl group but some other secondary alkyl group undergo similar dehydrogenation in the second step of the process to produce a 4-sec-alkylbiphenyl.

A 4-sec-alkylbiphenyl and particularly 4-isopropylbiphenyl which is formed by the process of this invention is a useful intermediate in the synthesis of other organic compounds including dyes, medicinals, insecticides, polymerization catalysts, and the like. Thus 4-isopropylbiphenyl may be subjected to nitration, reduction and coupling reactions to produce dyestuffs. Also 4-isopropylbiphenyl is a starting material for the production of a hydroperoxide which may be referred to by the following formula:

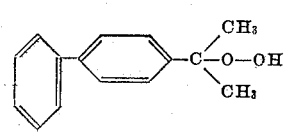

This material may be employed as a catalyst to promote polymerization of olefins, diolefins and arylalkenes as in the manufacture of synthetic rubber.

Also, the reaction of isopropylbiphenyl with itself in the presence of air or of a peroxide may yield a high molecular weight condensation product such as 1,1,2,2-tetramethyl-1,2-biphenylethane, represented by the formula:

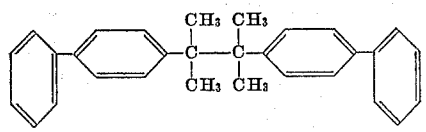

Such high molecular weight hydrocarbons are effective insecticides for clothes moths, mites, ticks, etc.

The nature of the present invention and results obtained thereby are illustrated by the following examples which should not be misconstrued to limit unduly the generally broad scope of the invention.

EXAMPLE I

In four different runs benzene was alkylated with 1-methyl-4-isopropylcyclohexene, menthol, dimethyl-(4-methylcyclohexyl)-carbinol and a mixture of para-menthenes in the presence of liquid hydrogen fluoride at a temperature of 0° to 5° C. In each of these runs two molecular proportions of benzene and one molecular proportion of substantially anhydrous hydrogen fluoride were placed in a copper lined autoclave and maintained at a temperature of 0° to 5° C. while a mixture of one molecular proportion of the alkylating agent, that is, the dihydroterpene or dihydroterpenic alcohol dissolved in one molecular proportion of benzene was added slowly thereto with stirring, during a time of about 0.5 hour. The reaction mixture was then stirred for an additional time of 1.0 hour after which it was poured upon ice, and the alkylate separated from aqueous hydrogen fluoride. The alkylate was then washed with water, dried, and distilled to separate unconverted benzene from the 1-methyl-1-phenyl-4-isopropylcyclohexane formed in the process.

The 1-methyl-1-phenyl-4-isopropylcyclohexane formed in these different runs had the properties shown in the following table:

TABLE I

*Cycloalkylation of benzene*

| Run No. | Cycoalkylating Agent | Production of 1-methyl-1-phenyl-4-isopropylcyclohexane | | | |
|---|---|---|---|---|---|
| | | Yield, Percent | Boiling Point, °C. | @ mm. | $n_D^{20}$ |
| 1 | 1-methyl-4-isopropylcyclohexene | [1] 60 | 112-116 | 3.2 | 1.5128 |
| 2 | menthol | 65 | 107-114 | 2.6 | 1.5133 |
| 3 | dimethyl-(4-methylcyclohexyl)-carbinol | 77 | 108-115 | 2.8 | 1.5138 |
| 4 | p-menthene-(x) | 75 | 110-114 | 3.0 | 1.5151 |

[1] Analysis calcd. for $C_{16}H_{24}$: C, 88.81; H, 11.19. Found: C, 88.70; H, 11.63.

EXAMPLE II

The alkylation product formed in Example I and consisting essentially of 1-methyl-1-phenyl-4-isopropylcyclohexane was passed slowly over a chromium sesquixode-alumina catalyst containing 10% by weight of $Cr_2O_3$ at a temperature of 435° C. The dehydrogenation converted 1-methyl-1-phenyl-4-isopropylcyclohexane into p-isopropylbiphenyl and gaseous products consisting mainly of hydrogen and methane as shown in the following tabulation:

*Dehydrogenation of benzene cycloalkylates*

| Run Numbers | 1 | 2 | 3 |
|---|---|---|---|
| Cycloalkylating agents | 1-methyl-4-isopropylcyclohexene. | menthol | dimethyl(4-methylcyclohexyl)-carbinol. |
| Dehydrogenation product | p-isopropylbiphenyl. | p-isopropylbiphenyl. | p-isopropylbiphenyl. |
| Gaseous products: | | | |
| $CH_4$ | 21 | 24 | 26. |
| $C_2H_6$ | 3 | 1 | 1. |
| $C_3H_8$ | 5 | 2 | 1. |
| $H_2$ | 71 | 73 | 72. |

We claim as our invention:

1. A process for producing a 4-alkylbiphenyl which comprises catalytically cycloalkylating benzene with a member of the group consisting of a monocyclic dihydroterpene, a homologue of a monocyclic dihydroterpene having the general formula:

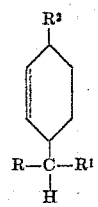

in which each of R and R¹ represents an alkyl group, R² represents a member of the group consisting of a methyl group and an ethyl group, and the double bond is located at any position in the cyclohexene ring, a dihydroterpenic alcohol represented by one of the formulae:

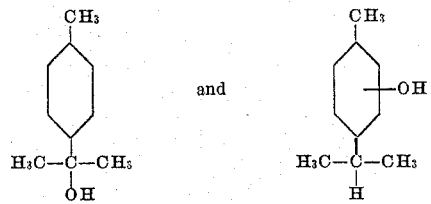

and a homologue of a dihydroterpenic alcohol represented by one of the formulae:

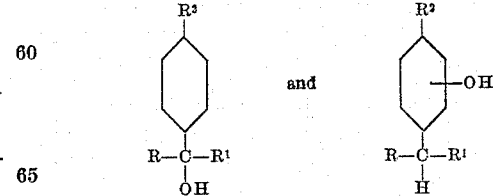

in which each of R and R¹ represents an alkyl group and R² represents a member of the group consisting of a methyl group and an ethyl group to form a 1-alkyl-1-phenyl-4-alkylcyclohexane, dehydrogenating the last-named compound to form a 4-alkylbiphenyl, a gaseous paraffin hydrocarbon and hydrogen, and recovering said 4-alkylbiphenyl.

2. A process for producing 4-isopropylbiphenyl which comprises catalytically cycloalkylating benzene with a monocyclic dihydroterpene to form 1-methyl-1-phenyl-4-isopropylcyclohexane, dehydrogenating the last-named compound to form 4-isopropylbiphenyl, methane and hydrogen, and recovering said 4-isopropylbiphenyl.

3. A process for producing 4-isopropylbiphenyl which comprises catalytically cycloalkylating benzene with a monocyclic dihydroterpenic alcohol to form 1-methyl-1-phenyl-4-isopropylcyclohexane, dehydrogenating the last-named compound to form 4-isopropylbiphenyl, methane and hydrogen, and recovering said 4-isopropylbiphenyl.

4. A process for producing 4-isopropylbiphenyl which comprises cycloalkylating benzene with dihydrolimonene in the presence of hydrogen fluoride catalyst to form 1-methyl-1-phenyl-4-isopropylcyclohexane, dehydrogenating the last-named compound to form 4-isopropylbiphenyl, methane and hydrogen, and recovering said 4-isopropylbiphenyl.

5. A process for producing 4-isopropylbiphenyl which comprises cycloalkylating benzene with para-menthene in the presence of hydrogen fluoride catalyst to form 1-methyl-1-phenyl-4-isopropylcyclohexane, dehydrogenating the last-named compound to form 4-isopropylbiphenyl, methane and hydrogen, and recovering said 4-isopropylbiphenyl.

6. A process for producing 4-isopropylbiphenyl which comprises cycloalkylating benzene with menthol in the presence of hydrogen fluoride catalyst to form 1-methyl-1-phenyl-4-isopropylcyclohexane, dehydrogenating the last-named compound to form 4-isopropylbiphenyl, methane and hydrogen, and recovering said 4-isopropylbiphenyl.

7. A process for producing 4-isopropylbiphenyl which comprises cycloalkylating benzene with dihydroterpineol in the presence of hydrogen fluoride catalyst to form 1-methyl-1-phenyl-4-isopropylcyclohexane, dehydrogenating the last-named compound to form 4-isopropylbiphenyl, methane and hydrogen, and recovering said 4-isopropylbiphenyl.

8. A process for producing 4-isopropylbiphenyl which comprises catalytically cycloalkylating benzene with a monocyclic dihydroterpene at a temperature of from about −10° to about +50° C. in the presence of hydrofluoric acid catalyst of at least 90% hydrogen fluoride concentration to form 1-methyl-1-phenyl-4-isopropylcyclohexane, dehydrogenating the last-named compound at a temperature of from about 400° to about 550° C. in the presence of a composite of activated alumina and an oxide of a metal selected from the members of the left-hand columns of groups IV, V and VI of the periodic table to form 4-isopropylbiphenyl, methane and hydrogen, and recovering said 4-isopropylbiphenyl.

9. A process for producing 4-isopropylbiphenyl which comprises catalytically cycloalkylating benzene with a dihydroterpenic alcohol at a temperature of from about −10° to about +50° C. in the presence of hydrofluoric acid catalyst of at least 90% hydrogen fluoride concentration to form 1-methyl-1-phenyl-4-isopropylcyclohexane, dehydrogenating the last-named compound at a temperature of from about 400° to about 550° C. in the presence of a composite of activated alumina and an oxide of a metal selected from the members of the left hand columns of groups IV, V and VI of the periodic table to form 4-isopropylbiphenyl, methane and hydrogen, and recovering 4-isopropylbiphenyl.

10. A process for producing 4-isopropylbiphenyl which comprises catalytically cycloalkylating benzene with a monocyclic dihydroterpene at a temperature of from about −10° to about +50° C. in the presence of hydrofluoric acid catalyst of at least 90% hydrogen fluoride concentration to form 1-methyl-1-phenyl-4-isopropylcyclohexane, dehydrogenating the last-named compound at a temperature of from about 400° to about 550° C. in the presence of a composite of from about 4 to about 20% by weight of chromium sesquioxide and from about 96 to about 80% by weight of activated alumina to form 4-isopropylbiphenyl, methane and hydrogen, and recovering said 4-isopropylbiphenyl.

11. A process for producing 4-isopropylbiphenyl which comprises catalytically cycloalkylating benzene with a dihydroterpenic alcohol at a temperature of from about −10° to about +50° C. in the presence of hydrofluoric acid catalyst of at least 90% hydrogen fluoride concentration to form 1-methyl-1-phenyl-4-isopropylcyclohexane, dehydrogenating the last-named compound at a temperature of from about 400° to about 550° C. in the presence of a composite of from about 4 to about 20% by weight of chromium sesquioxide and from about 96 to about 80% by weight of activated alumina to form 4-isopropylbiphenyl, methane and hydrogen, and recovering said 4-isopropylbiphenyl.

12. A process for producing 4-isopropylbiphenyl which comprises catalytically cycloalkylating benzene with a monocyclic dihydroterpene at a temperature of from about −10° to about +50° C. in the presence of hydrofluoric acid catalyst of at least 90% hydrogen fluoride concentration to form 1-methyl-1-phenyl-4-isopropylcyclohexane, dehydrogenating the last-named compound at a temperature of from about 300° to about 425° C. in the presence of a composite of platinum and alumina to form 4-isopropylbiphenyl, methane and hydrogen, and recovering said 4-isopropylbiphenyl.

13. A process for producing a 4-alkylbiphenyl which comprises catalytically cycloalkylating benzene with a member of the group consiting of a monocyclic dihydroterpene, a homologue of a monocyclic dihydroterpene having the general formula:

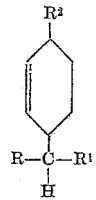

in which each of R and R¹ represents an alkyl group, R² represents a member of the group consisting of a methyl group and an ethyl group, and the double bond is located at any position in the molecule, a dihydroterpenic alcohol represented by one of the formulae:

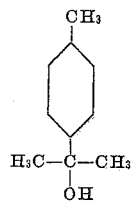 and 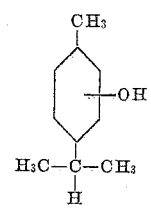

and a homologue of a dihydroterpenic alcohol represented by one of the formulae:

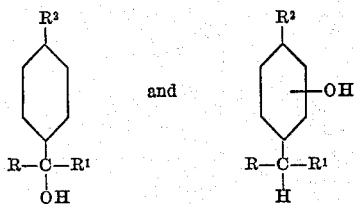

in which each of R and $R^1$ represents an alkyl group and $R^2$ represents a member of the group consisting of a methyl group and an ethyl group to form a 1-alkyl-1-phenyl-4-alkylcyclohexane, dehydrogenating the last-named compound to form a 4-alkylbiphenyl, a gaseous paraffin hydrocarbon and hydrogen, and recovering said 4-alkylbiphenyl.

14. A process for producing 4-isopropylbiphenyl which comprises catalytically cycloalkylating benzene with a cycloalkylating agent selected from the group consisting of a monocyclic dihydroterpene and a monocyclic dihydroterpenic alcohol to form 1-methyl-1-phenyl-4-isopropylcyclohexane, dehydrogenating the last-named compound to form 4-isopropylbiphenyl, methane and hydrogen, and recovering said 4-isopropylbiphenyl.

VLADIMIR N. IPATIEFF.
HERMAN PINES.

REFERENCES CITED

The following references are of record in the file of this patent:

UNITED STATES PATENTS

| Number | Name | Date |
|---|---|---|
| 1,969,984 | Martin et al. | Aug. 14, 1934 |
| 2,376,308 | Dixon | May 15, 1945 |
| 2,401,246 | Hull | May 28, 1946 |
| 2,487,338 | Johnson et al. | Nov. 8, 1949 |
| 2,550,531 | Ciapetta | Apr. 24, 1951 |

OTHER REFERENCES

Linstead et al.: "Jour. Chem. Soc." (1940), pp. 1127–34.

Simons: "Ind. Eng. Chem.," vol. 32, pp. 178–83 (Feb. 1940).